(12) United States Patent
Webb et al.

(10) Patent No.: US 12,180,841 B2
(45) Date of Patent: Dec. 31, 2024

(54) SEAL ELEMENT BONDED TO SEAL CARRIER FOR A TURBINE ENGINE

(71) Applicant: Raytheon Technologies Corporation, Farmington, CT (US)

(72) Inventors: Scot A. Webb, Gales Ferry, CT (US); Michael D. Greenberg, Bloomfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/079,434

(22) Filed: Dec. 12, 2022

(65) Prior Publication Data

US 2023/0184123 A1 Jun. 15, 2023

Related U.S. Application Data

(60) Provisional application No. 63/288,016, filed on Dec. 10, 2021.

(51) Int. Cl.
*F01D 11/00* (2006.01)

(52) U.S. Cl.
CPC ...... *F01D 11/003* (2013.01); *F05D 2230/237* (2013.01); *F05D 2240/55* (2013.01); *F05D 2300/141* (2013.01); *F05D 2300/224* (2013.01)

(58) Field of Classification Search
CPC ............ F01D 11/003; F05D 2230/237; F05D 2240/55; F05D 2300/141; F05D 2300/224; F16J 15/34; F16J 15/3464; F16J 15/348
See application file for complete search history.

(56) References Cited

U.S. PATENT DOCUMENTS

| | | | |
|---|---|---|---|
| 4,406,459 A | 9/1983 | Davis | |
| 4,523,764 A | 6/1985 | Albers | |
| 5,160,149 A | 11/1992 | Winn | |
| 5,183,270 A | 2/1993 | Alten | |
| 5,622,438 A * | 4/1997 | Walsh | F01D 25/162 384/624 |
| 5,632,435 A | 5/1997 | Schmied | |
| 5,639,096 A | 6/1997 | Ullah | |
| 5,791,205 A | 8/1998 | Ruppert, Jr. | |
| 6,918,594 B2 | 7/2005 | Sund | |
| 8,714,557 B2 | 5/2014 | Miller | |
| 10,344,679 B2 | 7/2019 | James | |
| 11,187,093 B2 | 11/2021 | Trivedi | |
| 2015/0275684 A1 * | 10/2015 | Thatte | F01D 11/001 415/230 |

(Continued)

FOREIGN PATENT DOCUMENTS

| | | |
|---|---|---|
| FR | 2729322 B1 | 4/1997 |
| JP | 55044110 A * | 9/1978 |

OTHER PUBLICATIONS

EP search report for EP22212956.1 dated May 26, 2023.

*Primary Examiner* — Gilbert Y Lee
(74) *Attorney, Agent, or Firm* — Getz Balich LLC (57) ABSTRACT

An assembly is provided for rotational equipment. This assembly includes a metal seal carrier and a carbon seal element. The metal seal carrier includes a receptacle and a cylindrical carrier surface forming an outer peripheral boundary of the receptacle. The carbon seal element is seated in the receptacle. The carbon seal element includes a cylindrical element surface that is brazed to the cylindrical carrier surface.

20 Claims, 6 Drawing Sheets

(56) References Cited

U.S. PATENT DOCUMENTS

| | | |
|---|---|---|
| 2018/0195415 A1 | 7/2018 | Witlicki |
| 2018/0355757 A1 | 12/2018 | Walker |
| 2018/0363781 A1 | 12/2018 | Pehl |
| 2020/0131936 A1* | 4/2020 | Amador ............... F01D 11/003 |
| 2020/0318740 A1 | 10/2020 | Guo |
| 2021/0115812 A1 | 4/2021 | Siw |
| 2021/0332889 A1 | 10/2021 | Nasman |

* cited by examiner

SEAL ELEMENT BONDED TO SEAL CARRIER FOR A TURBINE ENGINE

This application claims priority to U.S. Provisional Patent Application No. 63/288,016 filed Dec. 10, 2021, which is hereby incorporated herein by reference in its entirety.

BACKGROUND OF THE DISCLOSURE

1. Technical Field

This disclosure relates generally to a turbine engine and, more particularly, to a seal assembly for the turbine engine.

2. Background Information

A gas turbine engine may include a seal assembly with a carbon seal element. The carbon seal element may be supported by a metal seal carrier. The seal element may be retained with the seal carrier via an interference fit between the seal element and the seal carrier. For certain applications, the seal element may also be temporarily retained during installation using an adhesive. However, since carbon is relatively brittle, a pressure of the interference fit is relatively small. Where the interference fit pressure is small enough and where the adhesive degrades due to relatively high engine operating temperatures, the seal element may shift within the seal carrier during gas turbine engine operation as well as during handling of an assembly of the seal element and the seal carrier prior to assembly within the gas turbine engine. There is a need in the art therefore for an improved connection between a seal element and its seal carrier.

SUMMARY OF THE DISCLOSURE

According to an aspect of the present disclosure, an assembly is provided for rotational equipment. This assembly includes a metal seal carrier and a carbon seal element. The metal seal carrier includes a receptacle and a cylindrical carrier surface forming an outer peripheral boundary of the receptacle. The carbon seal element is seated in the receptacle. The carbon seal element includes a cylindrical element surface that is brazed to the cylindrical carrier surface.

According to another aspect of the present disclosure, another assembly is provided for rotational equipment. This assembly includes a metal seal carrier and a carbon seal element. The metal seal carrier includes a receptacle, an axial carrier surface and a radial carrier surface. The receptacle extends circumferentially within the metal seal carrier about an axis. The receptacle extends axially along the axis into the metal seal carrier to the radial carrier surface. The receptacle extends radially within the metal seal carrier to the axial carrier surface. The carbon seal element extends circumferentially about the axis and is seated in the receptacle. The carbon seal element is brazed to the metal seal carrier.

According to still another aspect of the present disclosure, another assembly is provided for rotational equipment. This assembly includes a metal seal carrier, a carbon seal element and bonding material. The metal seal carrier includes a receptacle and a cylindrical carrier surface forming a peripheral boundary of the receptacle within the seal carrier. The carbon seal element is seated in the receptacle. The carbon seal element includes a cylindrical element surface. A gap is formed radially between the cylindrical carrier surface and the cylindrical element surface. The bonding material is disposed in the gap and bonds the carbon seal element to the metal seal carrier.

The rotational equipment may be configured as or otherwise include a turbine engine.

The carbon seal element may be brazed to the axial carrier surface.

The carbon seal element may be brazed to the radial carrier surface.

The bonding material may be configured as or otherwise include braze material.

The cylindrical element surface may be brazed to the cylindrical carrier surface with a braze material configured from or otherwise including silver.

The cylindrical element surface may be brazed to the cylindrical carrier surface with a braze material configured from or otherwise including nickel.

At least a portion of the carbon seal element forming the cylindrical element surface may be configured from or otherwise include metallized carbon material.

The metal seal carrier may also include an annular carrier surface forming a side peripheral boundary of the receptacle. The carbon seal element may also include an annular element surface engaged with the annular carrier surface.

The annular element surface may be brazed to the annular carrier surface.

The metal seal carrier may extend circumferentially about an axis. The receptacle may extend radially into the metal seal carrier to the cylindrical carrier surface. The receptacle may extend axially into the metal seal carrier to the annular carrier surface.

The carbon seal element may include a base and a protrusion. The base may be seated in the receptacle and may include the cylindrical element surface. The protrusion may project out axially out from the base to an annular land engagement surface.

The assembly may also include a seal land which includes an annular seal land surface. The carbon seal element may include an annular land engagement surface engaged with the annular seal land surface to provide a seal interface.

The assembly may also include a seal land configured to rotate about an axis. The carbon seal element may be configured to axially engage the seal land.

The assembly may also include a turbine engine rotating assembly which includes the seal land.

The assembly may also include a bladed rotor and a shaft connected to the bladed rotor. The seal land may circumscribe and may be mounted on the shaft.

The assembly may also include a stationary structure. The metal seal carrier may be movably attached to the stationary structure.

The assembly may also include a spring element between and engaged with the stationary structure and the metal seal carrier.

The spring element may be configured as or otherwise include a bellows.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
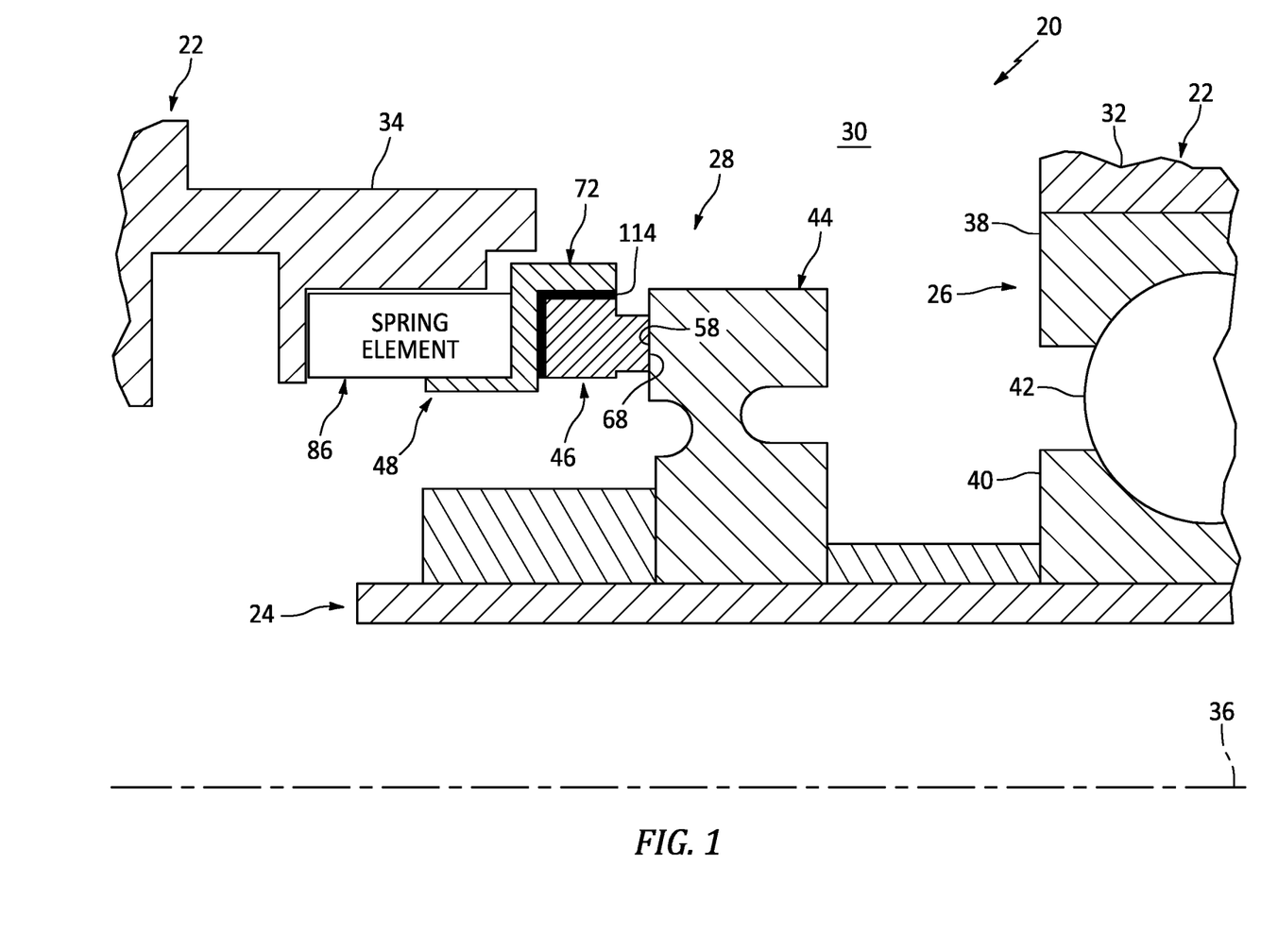
FIG. 1 is a partial schematic illustration of an assembly for a turbine engine.

FIG. 1 is a partial side sectional illustration of an assembly 20 for a turbine engine. The turbine engine may be configured as a geared or a direct drive gas turbine engine for an aircraft propulsion system. The present disclosure, however, is not limited to aircraft propulsion system applications. The turbine engine, for example, may alternatively be configured as an auxiliary power unit (APU) for an aircraft, an industrial gas turbine engine for power generation or any other type of turbine engine.

The turbine engine assembly 20 of FIG. 1 includes a stationary structure 22, a rotating structure 24 and a bearing 26 for rotatably supporting the rotating structure 24 relative to the stationary structure 22. The turbine engine assembly 20 of FIG. 1 also includes a seal assembly 28 configured to seal an annular gap between the rotating structure 24 and the stationary structure 22.

The stationary structure 22 is configured as a static, non-rotating part of the turbine engine. The stationary structure 22 of FIG. 1, for example, is configured to at least partially form an internal bearing compartment 30 for housing at least the bearing 26. This stationary structure 22 includes a bearing support 32 such as, but not limited to, a strut assembly or a frame. The stationary structure 22 also includes a seal assembly support 34 such as, but not limited to, an annular wall and mount.

The rotating structure 24 is configured to rotate about a rotational axis 36, which axis 36 may be a rotational axis and/or an axial centerline of the turbine engine assembly 20 and/or the turbine engine. The rotating structure 24 of FIG. 1 is configured as a tubular shaft. However, in other embodiments, the rotating structure 24 may alternatively be configured as another component (e.g., a sleeve) mounted to and rotatable with a shaft of the turbine engine, or any other rotational component within the turbine engine. The rotating structure 24 of FIG. 1 extends axially along the rotational axis 36 through (or partially into or within) the stationary structure 22. The stationary structure 22 of FIG. 1 thereby extends circumferentially about (e.g., completely around) the rotational axis 36 and the rotating structure 24.

The bearing 26 may be configured as a rolling element bearing. The bearing 26 of FIG. 1, for example, includes an annular outer race 38, an annular inner race 40 and a plurality of bearing elements 42; e.g., cylindrical or spherical elements. The outer race 38 circumscribes the inner race 40 and the bearing elements 42. The outer race 38 is mounted to the stationary structure 22 and, more particularly, the bearing support 32. The inner race 40 circumscribes and is mounted to the rotating structure 24. The bearing elements 42 are arranged in an annular array about the rotational axis 36, where each of the bearing elements 42 is radially between and engaged with the outer race 38 and the inner race 40. The present disclosure, however, is not limited to the foregoing exemplary bearing configuration. For example, in other embodiments, the bearing 26 may alternatively be configured as a journal bearing or any other type of bearing utilized in the turbine engine.

The seal assembly 28 of FIG. 1 is configured to seal the gap which extends (e.g., radially and/or axially) between the stationary structure 22 and the rotating structure 24. Of course, in other embodiments, the seal assembly 28 may seal a gap extending between the stationary structure 22 and another rotating component mounted to and/or rotatable with the rotating structure 24. The seal assembly 28 of FIG. 1 includes a rotating annular seal land 44, a non-rotating seal element 46 and a seal support assembly 48.

Figure 2:
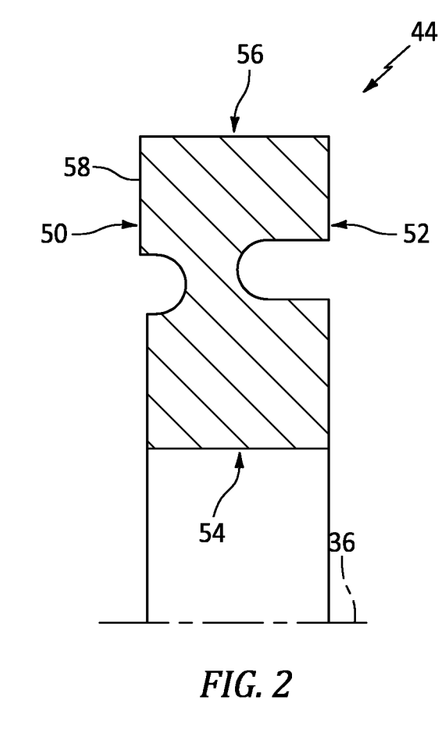
FIG. 2 is a partial sectional illustration of a seal land.
Figure 3:
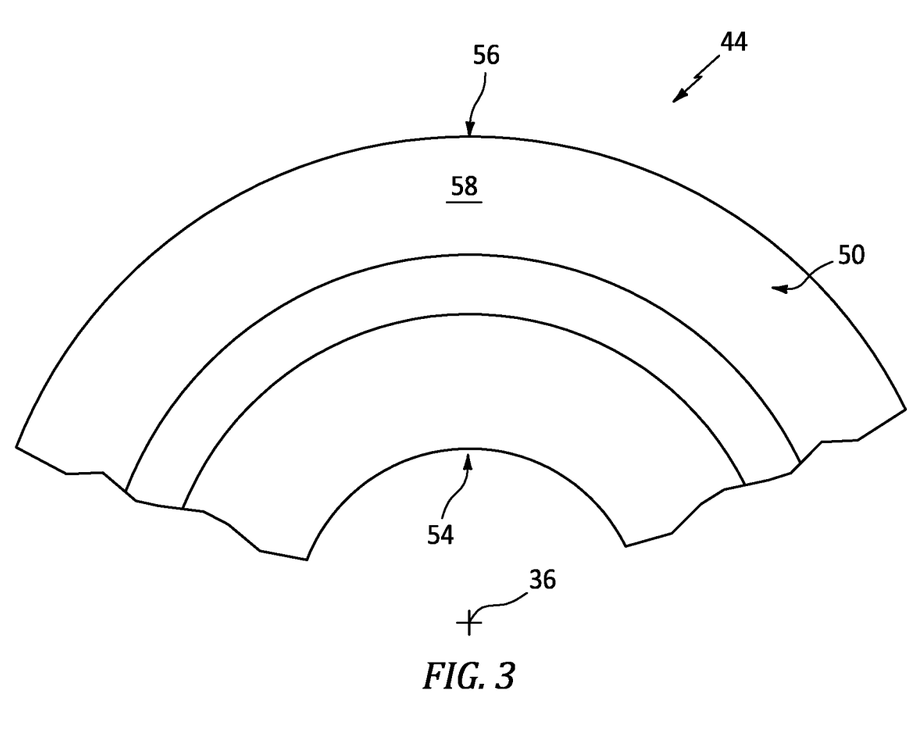
FIG. 3 is a partial end view illustration of the seal land.

Referring to FIGS. 2 and 3, the seal land 44 extends circumferentially about (e.g., completely around) the rotational axis 36. The seal land 44 may thereby be configured with a full hoop body. Referring to FIG. 2, the seal land 44 extends axially along the rotational axis 36 between and to an axial first end 50 of the seal land 44 and an axial second end 52 of the seal land 44. The seal land 44 extends radially between and to a radial inner side 54 of the seal land 44 and a radial outer side 56 of the seal land 44.

The seal land 44 includes an annular, radially extending seal land surface 58 located at (e.g., on, adjacent or proximate) the seal land first end 50. This seal land surface 58 may be a substantially uninterrupted surface (see also FIG. 3), which seal land surface 58 may lay in a plane perpendicular to the rotational axis 36. The seal land surface 58, for example, may be a flat planar surface configured without (e.g., circumferential and/or radial) interruptions such as, but not limited to, channels, slots and apertures. Of course, in other embodiments, the seal land surface 58 may be (e.g., circumferentially and/or radially) interrupted by one or more channels, slots, apertures and/or other types of surface interruptions.

The seal land 44 is constructed as a monolithic body from a seal land material. This seal land material may be a metal such as, but not limited to, a nickel alloy and/or an iron alloy. The seal land material, for example, may be Inconel 718 or AISI 4140 steel alloy, typically with a hard coating on the faying seal land surface 58. The present disclosure, however, is not limited to the foregoing exemplary seal land materials.

Figure 4:
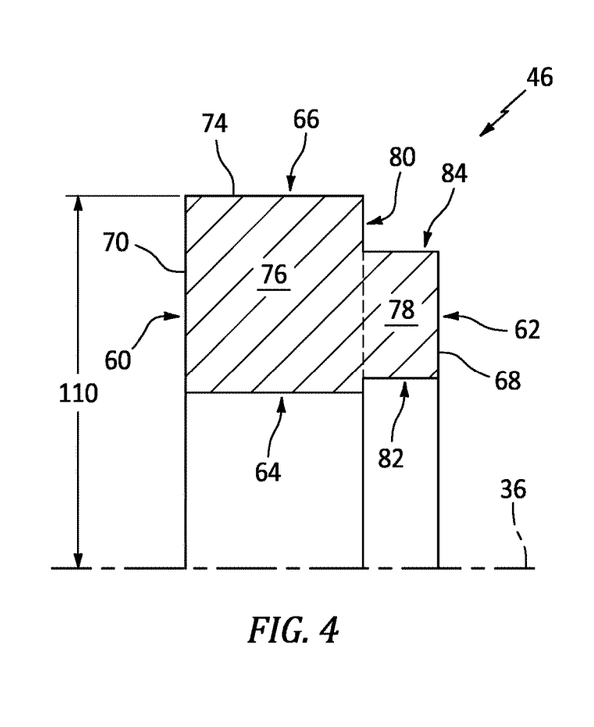
FIG. 4 is a partial sectional illustration of a seal element.
Figure 5:
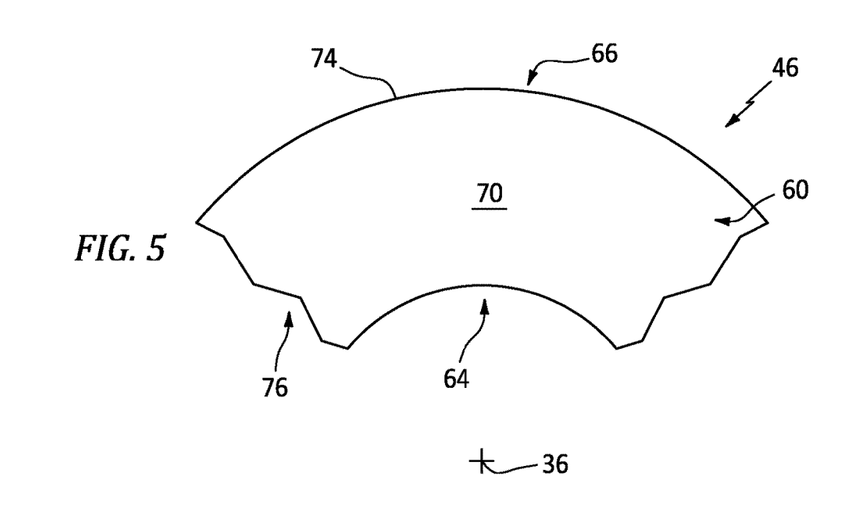
FIG. 5 is a partial first end illustration of the seal element.
Figure 6:
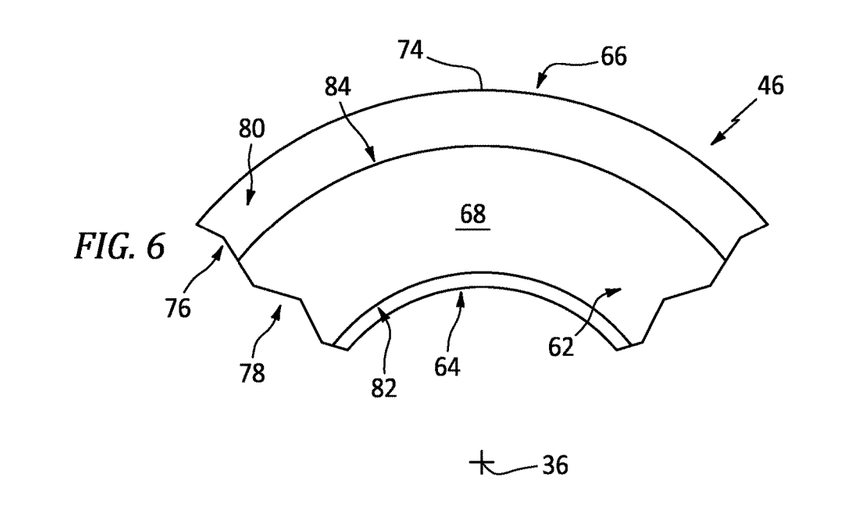
FIG. 6 is a partial second end illustration of the seal element.

Referring to FIGS. 4-6, the seal element 46 extends circumferentially about (e.g., completely around) the rotational axis 36. The seal element 46 may thereby be configured with a full hoop body. This full hoop body may be a single unitary body; e.g., a monolithic body. Alternatively, the full hoop body may be a segmented body; e.g., the seal element 46 may be configured from an array of arcuate seal element segments. Referring to FIG. 4, the seal element 46 extends axially along the rotational axis 36 between an axial first end 60 of the seal element 46 and an axial second end 62 of the seal element 46. The seal element 46 extends radially between a radial inner side 64 of the seal element 46 and a radial outer side 66 of the seal element 46.

The seal element 46 includes an annular, radially extending land engagement surface 68 located at the seal element second end 62. This land engagement surface 68 is a substantially uninterrupted surface (see also FIG. 6), which land engagement surface 68 may lay in a flat plane perpendicular to the rotational axis 36. The land engagement surface 68, for example, may be a planar surface configured without (e.g., circumferential and/or radial) interruptions such as, but not limited to, channels, slots and apertures. Of course, in other embodiments, the land engagement surface 68 may be (e.g., circumferentially and/or radially) interrupted by one or more channels, slots, apertures and/or other types of surface interruptions.

The seal element 46 includes an annular, radially extending seal element surface 70 ("radial element surface") located at the seal element first end 60. This radial element surface 70 is a substantially uninterrupted surface (see also FIG. 5), which radial element surface 70 may lay in a plane perpendicular to the rotational axis 36. The radial element surface 70, for example, may be a flat planar surface configured without (e.g., circumferential and/or radial) interruptions such as, but not limited to, channels, slots and apertures. Of course, in other embodiments, the radial element surface 70 may be (e.g., circumferentially and/or radially) interrupted by one or more channels, slots, apertures and/or other types of surface interruptions. Such interruptions may enhance bonding between the seal element 46 and a seal carrier 72 of the seal support assembly 48 (see FIGS. 1 and 9) described below.

The seal element 46 includes a tubular, axially extending seal element surface 74 ("axial element surface") located at the seal element outer side 66. This axial element surface 74 is a substantially uninterrupted surface which extends circumferentially around the rotational axis 36. The axial element surface 74, for example, may be a cylindrical surface configured without (e.g., circumferential and/or axial) interruptions such as, but not limited to, channels, slots and apertures. Of course, in other embodiments, the axial element surface 74 may be (e.g., circumferentially and/or axially) interrupted by one or more channels, slots, apertures and/or other types of surface interruptions. Such interruptions may enhance the bonding between the seal element 46 and the seal carrier 72 (see FIG. 1) described below.

The seal element 46 of FIG. 4 is configured with a seal element base 76 and a seal element protrusion 78. The element base 76 of FIG. 4 forms (e.g., carries) the radial element surface 70 and the axial element surface 74. More particularly, this element base 76 extends radially between and to the seal element inner side 64 and the seal element outer side 66. The element base 76 extends axially along the rotational axis 36 from the seal element first end 60 to a second end 80 of the element base 76. The element protrusion 78 is connected to (e.g., formed integral with) the element base 76. The element protrusion 78 of FIG. 4 forms (e.g., carries) the land engagement surface 68. More particularly, the element protrusion 78 projects axially along the rotational axis 36 out from the element base 76 at its element base second end 80 to the seal element second end 62. The element protrusion 78 of FIG. 4 extends radially between and to an inner side 82 of the element protrusion 78 and an outer side 84 of the element protrusion 78. The element protrusion inner side 82 may be radially recessed outward from the seal element inner side 64. The element protrusion outer side 84 may be radially recessed inward from the seal element outer side 66.

The seal element 46 (or each segment thereof) is constructed as a monolithic body from a seal element material. This seal element material may be a carbon-based material such as, but not limited to, an electro-graphitic carbon (EGC). The seal element 46, for example, may be configured as a carbon seal element. With such a construction, the carbon-based material may form one or more or all of the seal element surfaces 68, 70 and 74. However, in some embodiments, at least a portion of the seal element 46 may be metallized with a metal material such as, but not limited to, manganese (Mn), molybdenum (Mo) or any other metal compatible with the seal element material. The metal material, for example, may be selectively diffused into the base seal element material. For example, at least (or only) portions of the seal element 46 forming the radial element surface 70 and/or the axial element surface 74 may be formed from metallized carbon material. This metallization may enhance the bonding between the seal element 46 and the seal carrier 72 (see FIG. 1) described below.

Referring to FIG. 1, the seal support assembly 48 includes the seal carrier 72 and at least one spring element 86; e.g., an annular bellows, one or more coils springs, etc. The seal carrier 72 of FIGS. 7 and 8 extends circumferentially about (e.g., completely around) the rotational axis 36. The seal carrier 72 may thereby be configured with a full hoop body. The seal carrier 72 extends axially along the rotational axis 36 between and to an axial first end 88 of the seal carrier 72 and an axial second end 90 of the seal carrier 72. The seal carrier 72 extends radially between and to a radial inner side 92 of the seal carrier 72 and a radial outer side 94 of the seal carrier 72.

Figure 7:
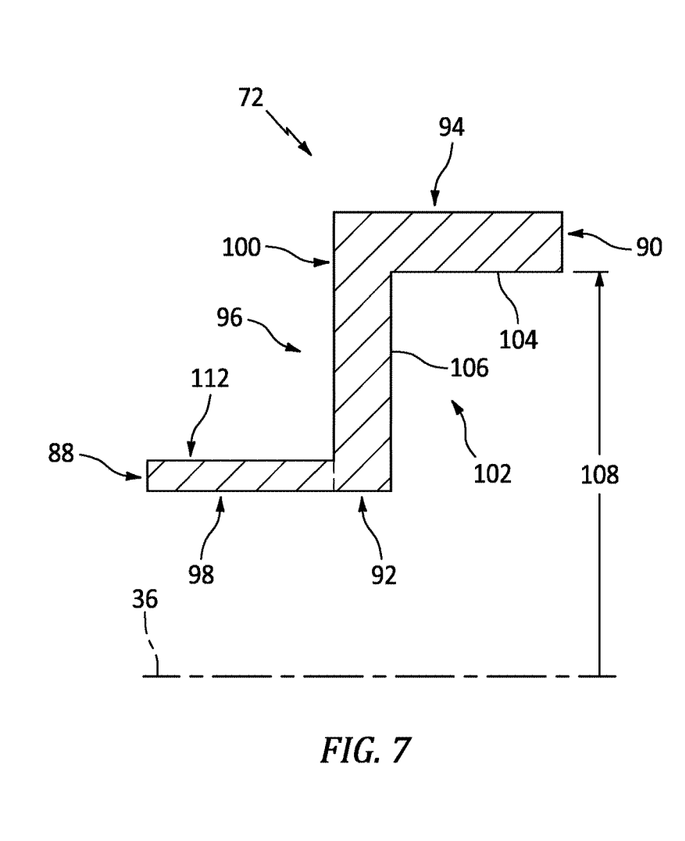
FIG. 7 is a partial sectional illustration of a seal carrier.
Figure 8:
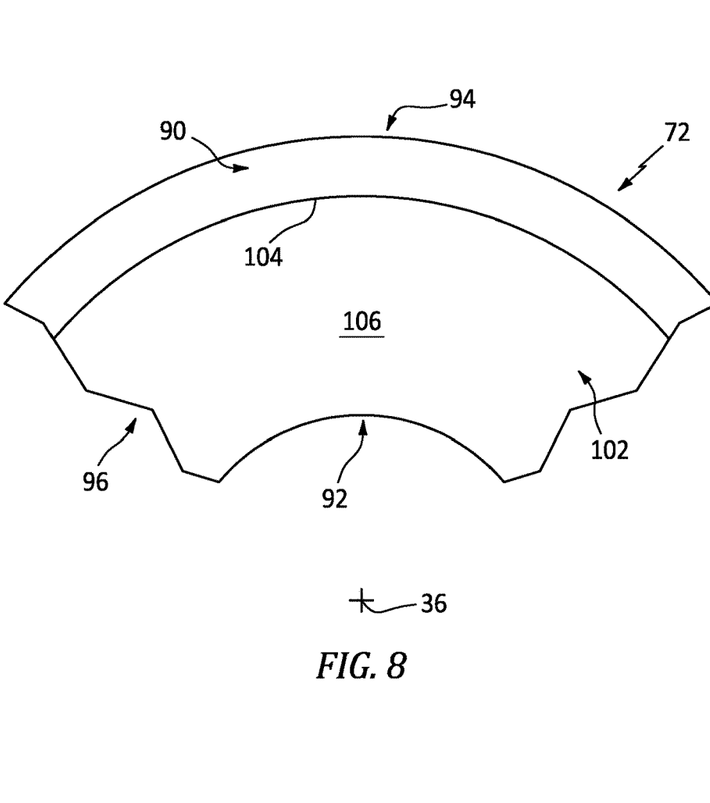
FIG. 8 is a partial end view illustration of the seal carrier.

The seal carrier 72 of FIG. 7 includes a seal carrier base 96 and a seal carrier flange 98. The carrier base 96 of FIG. 7 extends radially between and to seal carrier inner side 92 and the seal carrier outer side 94. The carrier base 96 of FIG. 7 extends axially along the rotational axis 36 from the seal carrier second end 90 to a first end 100 of the carrier base 96. The carrier base 96 of FIG. 7 is configured with an annular seal element receptacle 102. This receptacle 102 extends partially radially into the seal carrier 72 and its carrier base 96 from the seal carrier inner side 92 to a tubular, axially extending surface 104 ("axial carrier surface") of the seal carrier 72. The axial carrier surface 104 may thereby form an outer peripheral boundary of the receptacle 102 within the seal carrier 72. The receptacle 102 extends partially axially along the rotational axis 36 into the seal carrier 72 and its carrier base 96 from the seal carrier second end 90 to an annular, radially extending surface 106 ("radial carrier surface") of the seal carrier 72. The radial carrier surface 106 may thereby form a side peripheral boundary of the receptacle 102 within the seal carrier 72.

The axial carrier surface 104 may be a substantially uninterrupted surface which extends circumferentially around the rotational axis 36. The axial carrier surface 104, for example, may be a cylindrical surface configured without (e.g., circumferential and/or axial) interruptions such as, but not limited to, channels, slots and apertures. The present disclosure, however, is not limited to such an exemplary axial carrier surface configuration. The axial carrier surface 104 has a carrier surface radius 108, which is measured from the rotational axis 36 to the axial carrier surface 104. This carrier surface radius 108 may be sized larger than a seal element surface radius 110 of the axial element surface 74 of FIG. 4, which is measured from the rotational axis 36 to the axial element surface 74.

The radial carrier surface 106 may be a substantially uninterrupted surface (see also FIG. 8), which radial carrier surface 106 may lay in a plane perpendicular to the rotational axis 36. The radial carrier surface 106, for example, may be a flat planar surface configured without (e.g., circumferential and/or radial) interruptions such as, but not limited to, channels, slots and apertures. The present disclosure, however, is not limited to such an exemplary radial carrier surface configuration.

The carrier flange 98 is connected to (e.g., formed integral with) the carrier base 96. The carrier flange 98 of FIG. 7 is disposed at the seal carrier inner side 92 and the seal carrier first end 88. The carrier flange 98, for example, projects axially along the rotational axis 36 out from the carrier base first end 100 to the seal carrier first end 88. The carrier flange 98 extends radially between and to the seal carrier inner side 92 and a radial outer side 112 of the carrier flange 98. This carrier flange outer side 112 may be recessed radially inward from the seal carrier outer side 94.

The seal carrier 72 is constructed as a monolithic body from a seal carrier material. This seal carrier material may be selected to have a coefficient of thermal expansion (CTE) which is substantially similar to or the same as a coefficient of thermal expansion (CTE) of the seal element material. The seal carrier material may be a metal such as, but not limited to, a nickel alloy and/or an iron alloy. The seal carrier material, for example, may be 64FeNi (also known as Invar, UNS K93600) or Kovar (UNS K94610) or similar low CTE alloys. A bonded (e.g., brazed) interface at the cylindrical interface between the seal element 64 and the seal carrier 72 is generally in radial compression. The coefficient of thermal expansion of the seal carrier 72 therefore is ideally equal to or slightly greater than the coefficient of thermal expansion of the seal element 64 to reduce stresses imparted by the seal carrier 72 onto the seal element 64. The seal element material may be relatively brittle and may have relatively low tensile strength; thus, the seal element material may be fractured when subject to relatively large compressive stresses by the seal carrier 72. Matching the coefficient of thermal expansion of the seal element 64 and the seal carrier 72 may also minimize elastic deflection of the land engagement surface 68, where excess deflection may compromise the sealing function. The present disclosure, however, is not limited to the foregoing exemplary seal carrier materials.

Figure 9:
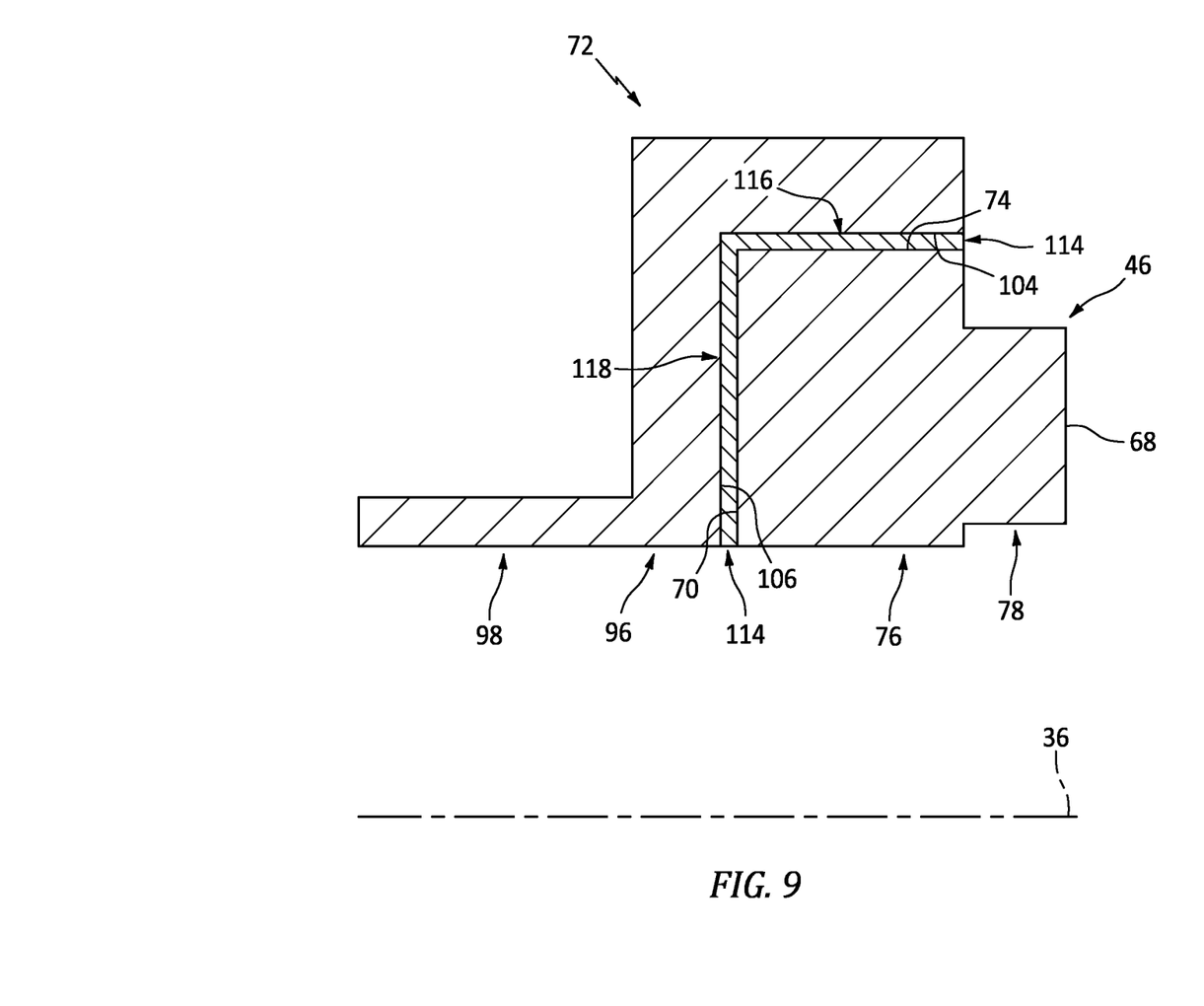
FIG. 9 is a partial sectional illustration of the seal element attached to the seal carrier with bonding material.

Referring to FIG. 9, the seal element 46 is mated with the seal carrier 72. The seal element 46 of FIG. 9, for example, is seated in the receptacle 102 (see FIG. 7), where the radial element surface 70 is axially engaged with the radial carrier surface 106, and where the axial element surface 74 is radially engaged with the axial carrier surface 104. The seal element 46 is also attached to the seal carrier 72. For example, the seal element 46 of FIG. 9 and its axial element surface 74 are bonded (e.g., brazed) to the seal carrier 72 and its axial carrier surface 104 with bonding material 114; e.g., braze material. This bonding material 114 fills a (e.g., tubular) gap formed by and radially between the axial element surface 74 and the axial carrier surface 104. The seal element 46 of FIG. 9 and its radial element surface 70 are also (or alternatively) bonded (e.g., brazed) to the seal carrier 72 and its radial carrier surface 106 with the bonding material 114. This bonding material 114 fills a (e.g., annular) gap formed by and axially between the radial element surface 70 and the radial carrier surface 106.

The bonding material 114 (e.g., braze material) is selected to bond to both the seal element material and the seal carrier material. The bonding material 114 may also be selected to have a coefficient of thermal expansion (CTE) which is substantially similar to or the same the coefficient of thermal expansion of the seal element material and/or the coefficient of thermal expansion of the seal carrier material. The bonding material 114 may have a melting point between 1100 and 2000 degrees Fahrenheit; however, the present disclosure is not limited to such an exemplary temperature range. The bonding material 114 may be a metal material such as, but not limited to, silver bonding material (e.g., braze material of or including silver) and nickel bonding material (e.g., braze material of or including nickel). The present disclosure, however, is not limited to the foregoing exemplary bonding materials.

With the foregoing arrangement, the seal element 46 is fixedly connected to the seal carrier 72. Providing the bonding material 114 at both a radial bond joint 116 and an axial bond joint 118 enhances the strength of the connection between the seal element 46 and the seal carrier 72, as compared to embodiments where the bonding material 114 is only included at the radial joint or the axial joint. Here, the radial bond joint 116 is subject to shear in both an axial direction and a circumferential direction whereas the axial bond joint 118 is subject to shear in the circumferential direction (but not the axial direction). It has been discovered therefore that the radial bond joint 116 (even alone) is particularly useful for connecting the seal element 46 to the seal carrier 72 as compared to use of the axial bond joint 118 alone. Furthermore, nesting the seal element 46 within the receptacle 102 (see FIG. 7) also serves to structurally support the seal element 46 during turbine engine operation as well as center the seal element 46 about the rotational axis 36 during assembly. The arrangement of the components 46 and 72 and the bond between the bonding material 114, the seal element material and the seal carrier material may thereby maintain the connection between the seal element 46 and the seal carrier 72 even when subject to relatively large vibrations, impacts, etc. By contrast, a slight interference fit between a traditional metal carrier and a traditional carbon seal element may fail when subject to relatively large vibrations, impacts, etc., which can lead to damage of the carbon seal element and/or poor sealing.

Referring to FIG. 1, the seal carrier 72 is mated with the stationary structure 22 and its seal assembly support 34. More particularly, the seal carrier 72 is movably connected to the stationary structure 22 such that the seal carrier 72 is operable to move (e.g., slide, translate) axially along the rotational axis 36 relative to the stationary structure 22. The seal carrier 72, for example, may be configured to ride along one or more guide rails (not shown) connected to the stationary structure 22. The spring element 86 is positioned axially between and engaged with (e.g., abutted against, contacts, etc.) the seal carrier 72 and the stationary structure 22 (or another intermediate component). The spring element 86 is thereby operable to bias/push the seal carrier 72 and, thus, the seal element 46 axially along the rotational axis 36 away from the stationary structure 22. This may facilitate and maintain sealing engagement (e.g., contact, a controlled fluid film, etc.) between the seal element 46 and its land engagement surface 68 and the seal land 44 and its seal land surface 58.

In some embodiments, the bonding material 114 may be a braze material. However, it is also contemplated the bonding material 114 may alternatively be an adhesive, for example, in lower temperature applications where that adhesive is not subject to thermal degradation.

Figure 10:
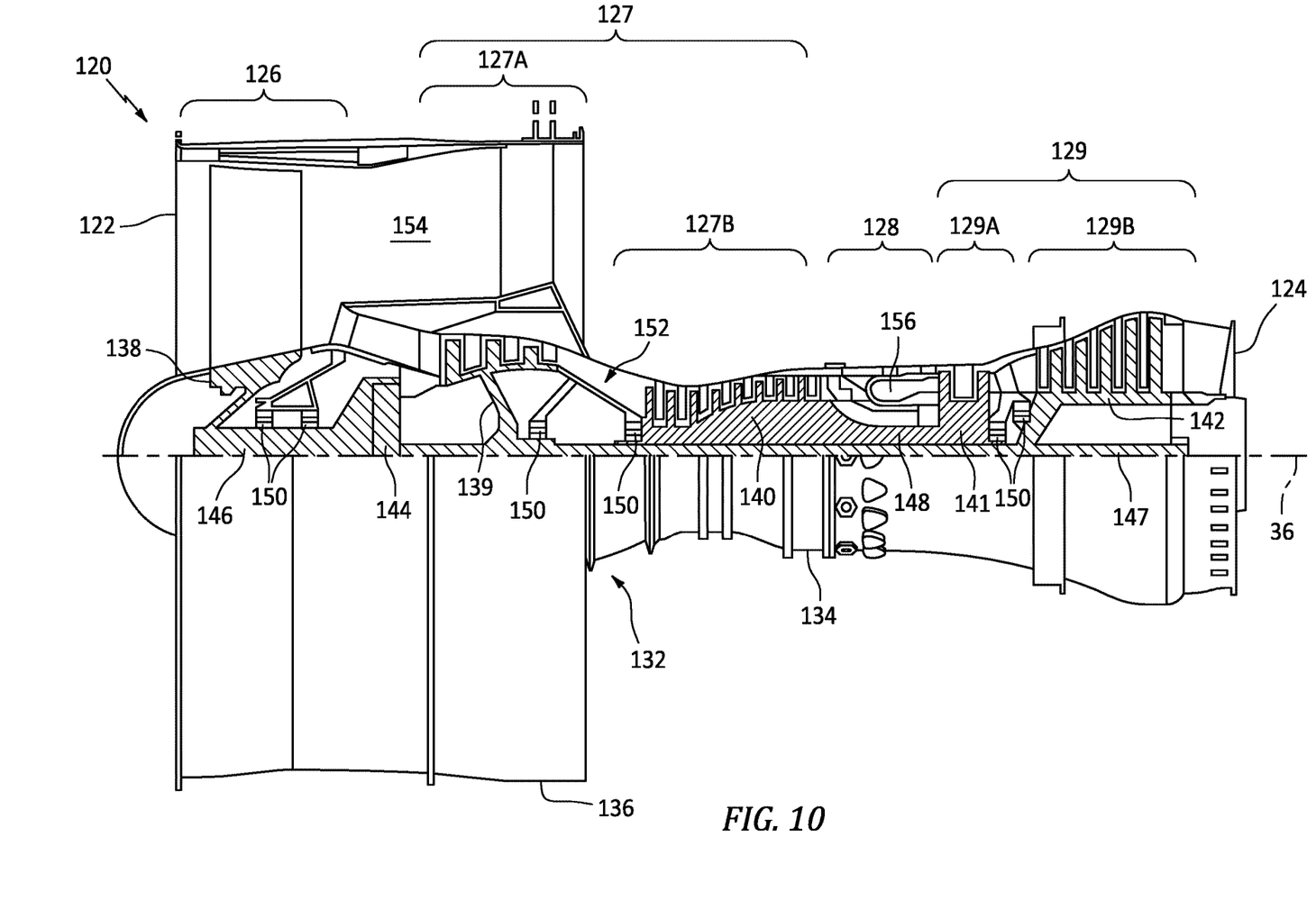
FIG. 10 is a side cutaway illustration of a geared gas turbine engine with which the turbine engine assembly may be included.

FIG. 10 is a side cutaway illustration of a geared gas turbine engine 120 with which the turbine engine assembly 20 of FIG. 1 may be configured. The gas turbine engine 120 extends along the rotational axis 36 between an upstream airflow inlet 122 and a downstream airflow exhaust 124. The gas turbine engine 120 includes a fan section 126, a compressor section 127, a combustor section 128 and a turbine section 129. The compressor section 127 includes a low pressure compressor (LPC) section 127A and a high pressure compressor (HPC) section 127B. The turbine section 129 includes a high pressure turbine (HPT) section 129A and a low pressure turbine (LPT) section 129B.

The engine sections 126-129B are arranged sequentially along the rotational axis 36 within an engine housing 132. This engine housing 132 includes an inner case 134 (e.g., a core case) and an outer case 136 (e.g., a fan case). The inner case 134 may house one or more of the engine sections 127A-129B; e.g., an engine core. This inner case 134 may include or may be connected to the stationary structure 22 of FIG. 1. The outer case 136 may house at least the fan section 126.

Each of the engine sections 126, 127A, 127B, 129A and 129B includes a respective bladed rotor 138-142. Each of these rotors 138-142 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 138 is connected to a gear train 144, for example, through a fan shaft 146. The gear train 144 and the LPC rotor 139 are connected to and driven by the LPT rotor 142 through a low speed shaft 147. The HPC rotor 140 is connected to and driven by the HPT rotor 141 through a high speed shaft 148. The shafts 146-148 are rotatably supported by a plurality of bearings 150. Each of these bearings 150 is connected to the engine housing 132 by at least one support structure. The rotating structure 24 of FIG. 1 may be configured as any one of the shafts 146-148 or a component mounted thereto or otherwise rotatable therewith, and the bearing 26 of FIG. 1 may be configured as any one of the bearings 150. The rotating structure 24 may therefore be part of a rotating assembly that further includes any one or more of the bladed rotors 138-142.

During operation, air enters the gas turbine engine 120 through the airflow inlet 122. This air is directed through the fan section 126 and into a core gas path 152 and a bypass gas path 154. The core gas path 152 extends sequentially through the engine sections 127A-129B. The air within the core gas path 152 may be referred to as "core air". The bypass gas path 154 extends through a bypass duct, which bypasses the engine core. The air within the bypass gas path 154 may be referred to as "bypass air".

The core air is compressed by the LPC rotor 139 and the HPC rotor 140 and directed into a combustion chamber 156 of a combustor in the combustor section 128. Fuel is injected into the combustion chamber 156 and mixed with the compressed core air to provide a fuel-air mixture. This fuel-air mixture is ignited and combustion products thereof flow through and sequentially cause the HPT rotor 141 and the LPT rotor 142 to rotate. The rotation of the HPT rotor 141 and the LPT rotor 142 respectively drive rotation of the HPC rotor 140 and the LPC rotor 139 and, thus, compression of the air received from a core airflow inlet. The rotation of the LPT rotor 142 also drives rotation of the fan rotor 138, which propels bypass air through and out of the bypass gas path 154. The propulsion of the bypass air may account for a majority of thrust generated by the gas turbine engine 120, e.g., more than seventy-five percent (75%) of engine thrust. The gas turbine engine 120 of the present disclosure, however, is not limited to the foregoing exemplary thrust ratio.

The turbine engine assembly 20 may be included in various turbine engines other than the one described above. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train; e.g., a direct drive turbine engine. The turbine engine assembly 20 may be included in a geared or non-geared turbine engine configured with a single spool, with two spools (e.g., see FIG. 10), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines. The present disclosure is also not limited to turbine engines, but rather may be utilized for other rotational equipment applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a metal seal carrier comprising a receptacle and a cylindrical carrier surface forming an outer peripheral boundary of the receptacle; and
a carbon seal element seated in the receptacle, the carbon seal element comprising a cylindrical element surface that is brazed to the cylindrical carrier surface with a braze material, and the braze material disposed radially between the cylindrical element surface and the cylindrical carrier surface.

2. The assembly of claim 1, wherein the braze material comprises silver.

3. The assembly of claim 1, wherein the braze material comprises nickel.

4. The assembly of claim 1, wherein at least a portion of the carbon seal element forming the cylindrical element surface comprises metallized carbon material.

5. The assembly of claim 1, wherein
the metal seal carrier further comprises an annular carrier surface forming a side peripheral boundary of the receptacle; and
the carbon seal element further comprises an annular element surface engaged with the annular carrier surface.

6. The assembly of claim 5, wherein the annular element surface is brazed to the annular carrier surface.

7. The assembly of claim 5, wherein
the metal seal carrier extends circumferentially about an axis;
the receptacle extends radially into the metal seal carrier to the cylindrical carrier surface; and
the receptacle extends axially into the metal seal carrier to the annular carrier surface.

8. The assembly of claim 1, wherein
the carbon seal element includes a base and a protrusion;
the base is seated in the receptacle and comprises the cylindrical element surface; and
the protrusion projects out axially out from the base to an annular land engagement surface.

9. The assembly of claim 1, further comprising:
a seal land comprising an annular seal land surface;
the carbon seal element comprising an annular land engagement surface engaged with the annular seal land surface to provide a seal interface.

10. The assembly of claim 1, further comprising:
a seal land configured to rotate about an axis;
the carbon seal element configured to axially engage the seal land.

11. The assembly of claim 10, further comprising a turbine engine rotating assembly comprising the seal land.

12. The assembly of claim 10, further comprising:
a bladed rotor; and
a shaft connected to the bladed rotor;
the seal land circumscribing and mounted on the shaft.

13. The assembly of claim 1, further comprising:
a stationary structure;
the metal seal carrier movably attached to the stationary structure.

14. The assembly of claim 13, further comprising a spring element between and engaged with the stationary structure and the metal seal carrier.

15. The assembly of claim 14, wherein the spring element comprises a bellows.

16. An assembly for rotational equipment, comprising:
a metal seal carrier comprising a receptacle, an axial carrier surface and a radial carrier surface, the receptacle extending circumferentially within the metal seal carrier about an axis, the receptacle extending axially along the axis into the metal seal carrier to the radial carrier surface, and the receptacle extending radially within the metal seal carrier to the axial carrier surface; and
a carbon seal element extending circumferentially about the axis and seated in the receptacle, the carbon seal element brazed to the metal seal carrier by a braze material disposed radially between the carbon seal element and the metal seal carrier.

17. The assembly of claim 16, wherein the carbon seal element is brazed to the axial carrier surface.

18. The assembly of claim 16, wherein the carbon seal element is brazed to the radial carrier surface.

19. An assembly for rotational equipment, comprising:
a metal seal carrier comprising a receptacle and a cylindrical carrier surface forming a peripheral boundary of the receptacle within the seal carrier;
a carbon seal element seated in the receptacle, the carbon seal element comprising a cylindrical element surface, and a gap formed radially between the cylindrical carrier surface and the cylindrical element surface; and
bonding material disposed, in the gap, radially between the cylindrical carrier surface and the cylindrical element surface, and the bonding material bonding the carbon seal element to the metal seal carrier.

20. The assembly of claim 19, wherein the bonding material comprises braze material.

* * * * *